3,332,760
APPARATUS PROVIDING A GASEOUS SUPPORT BED AND METHOD FOR TREATING GLASS OR THE LIKE THEREON
Harold A. McMaster, Woodville, and Arthur F. Van Zee, Toledo, Ohio, assignors to Permaglass, Inc., Woodville, Ohio, a corporation of Ohio
Filed Dec. 5, 1963, Ser. No. 328,409
10 Claims. (Cl. 65—25)

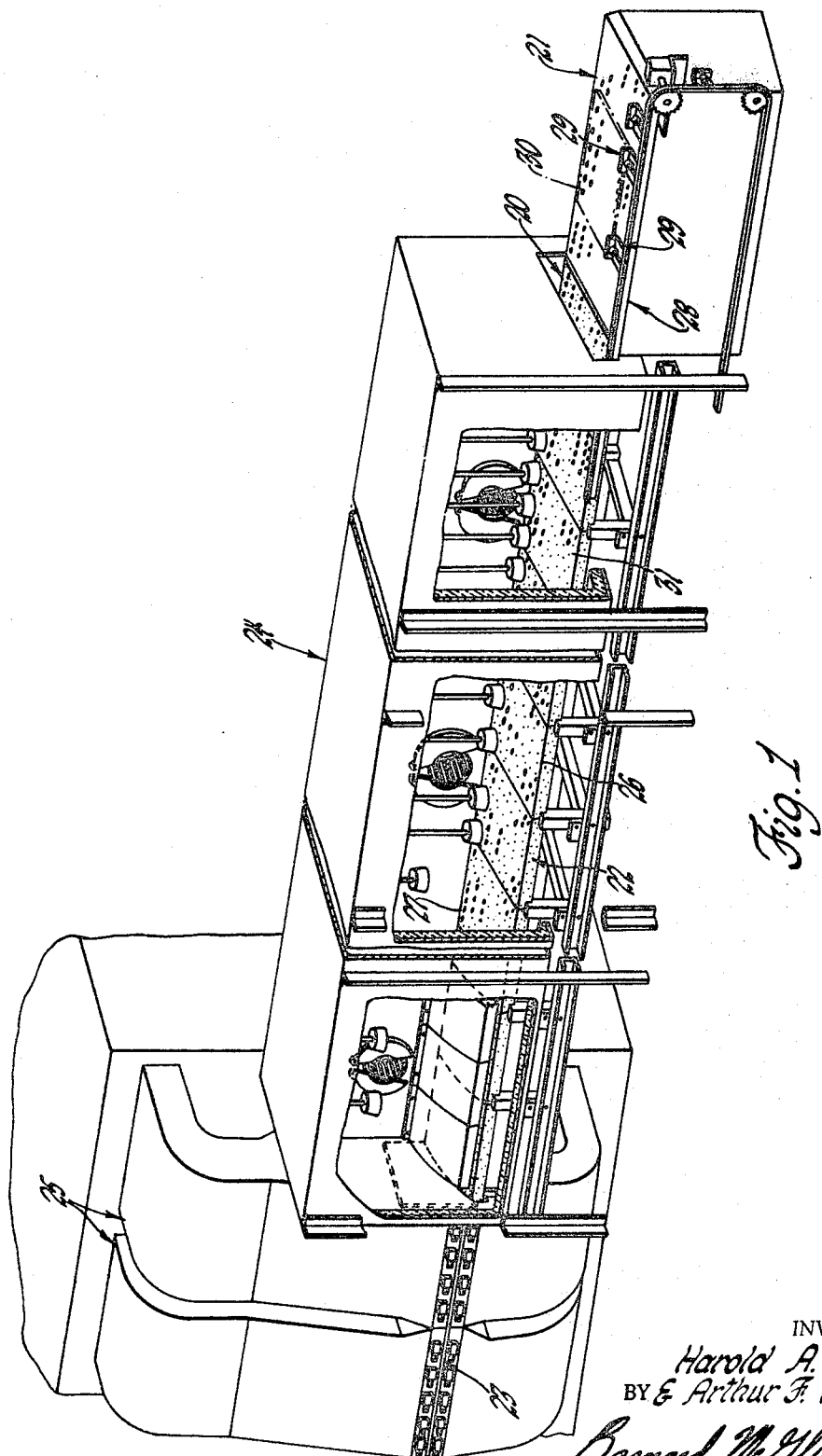

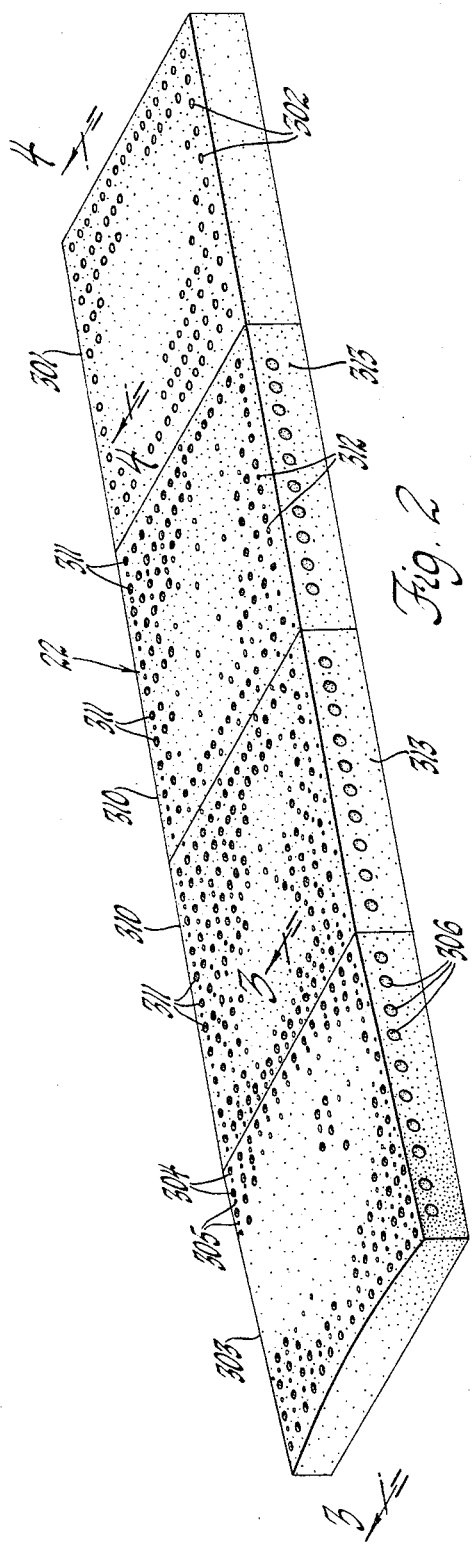
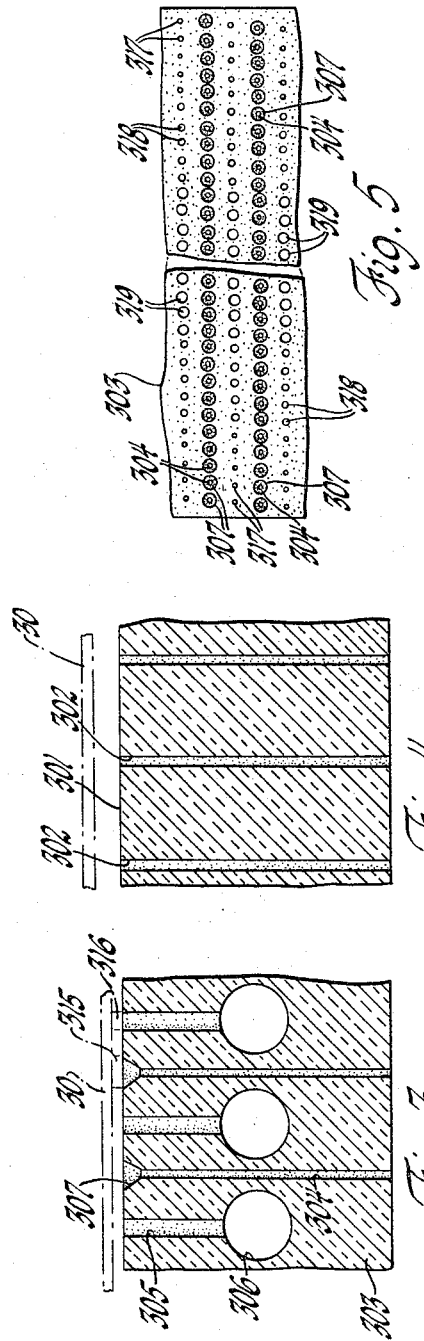

This invention relates to a method and apparatus for manufacturing sheet material. The invention has particular utility for manufacturing tempered glass sheets, such as are currently used for automobile windows, and hence will be described in detail with reference thereto; however, it will be understood that the invention also has utility for other treatments such as annealing, coating, chemical treatments and the like.

In recent years there has been a greatly increased demand for curved glass sheets or plates for use as automobile windows, protective windows for television screens, building windows, etc. At the same time there has been ever increasing recognition of the advantages of tempered glass particularly its high strength and safety features. Currently, the big demand is for windows of thin tempered curved glass. To manufacture tempered glass it is necessary that the individual glass pieces first be cut and formed to the particular shape desired and then tempered. Hence, to manufacture curved tempered glass automobile windows or the like, the essential sequence of steps is (1) form an untempered glass sheet to proper size, with edges rounded and polished as desired, (2) heat and bend the sheet to the curvature required and (3) rapidly and uniformly cool the curved sheet to provide the temper.

In United States patent application Serial No. 326,713, filed Nov. 29, 1963, in the names of Harold A. McMaster and Norman C. Nitschke and assigned to the assignee of the present invention there is disclosed and claimed an improved method and apparatus for manufacturing curved tempered glass sheets on a contiiuous basis. In accordance with that invention, the glass sheets to be curved and tempered are moved along an elongate perforated bed which extends through a heating furnace and then through a cooling blasthead, the bed being initially flat and then in a curvature transition zone thereof gradually becoming transversely curved. The glass sheets are floated on the bed portion within the furnace by hot gases emitted from the perforations therein, the gas temperature prior to and at the transition zone of the bed being at or above the deformation temperature of the glass. Hence, by the time the glass sheets have passed over the transition zone they have been heated by the hot gases to deformation temperatures such that they sag by gravity to conform to the curved contour of the bed. The hot curved glass sheets then float through the furnace zone maintained at slightly lower temperature and thence through the blasthead where they are cooled by and supported by room temperature air emitted from that portion of the bed within the blasthead.

Further, in accordance with the invention covered by the aforesaid patent application, the bed in the furnace has a first longitudinally extending portion which has only gas inlet or gas emitting perforations therein and a second longitudinally extending portion, commencing just prior to the curvature transition zone, which has both gas emitting and gas exhausting perforations therein. The glass sheets float relatively high, about from .04 to .25 inch, over the first bed portion and are floated relatively low, about from .005 to .02 inch over the second bed portion for reasons fully set forth in the aforesaid patent application and to be mentioned hereinafter. In the low float bed portion the gas emitting perforations are arranged in rows extending transversely of the bed with alternate transversely extending rows of gas exhausting perforations therebetween. Hence, the exhaust perforations are located closer to the inlet perforations than are the edges of the bed and the gas emitted from the inlet perforations instead of having to seek exit at the edge of the bed from between the bed and the supported glass sheet, can exit through the exhaust perforations.

With such method and apparatus, excellent tempered glass sheets can be produced at a continuous high production rate and at relatively low cost. However, in practice there are two problems which can arise. First, it has been found that when the glass drops from its high float to its low float position over the bed, there is hazard that the glass will make contact with the bed thereby causing marring of the glass. The second problem is that of nonuniformity in the flotation support of the glass sheets over the low float portion of the bed by reason of the free exit of gases from between the glass sheet and the bed at the edges of the latter. Specifically, it has been found that an edge portion, which can be on the order of one-half inch wide, at each side of the glass is inadequately supported because of exit of the support gases at the edges of the bed, and since the glass at this time is at or above its deformation temperature such edge portions of the glass can sag to a greater extent than desired, thereby misshaping of the glass sheet. The present invention has as its principal object a solution to these problems.

Briefly, in accordance with the present invention the bed is provided with a flotation transition zone between the high float portion and the low float portion. In this flotation transition zone, exhaust perforations are used, the number, size and distribution of these exhaust perforations being such that the exhaust area at the beginning of the zone is very small and then gradually increase in each successive longitudinally extending portion of the zone until it meets with the low float portion of the bed. More specifically, only a few exhaust perforations are used at the beginning of the flotation transition zone and the number of exhaust perforations then gradually increases per unit length of the zone until there is a full complement of exhaust perforations, the same as in the low float portion, at the point where the transition zone meets with the low float portion. Further in accordance with the invention, in the low float zone and preferably also in the transition zone at least at the end thereof which adjoins the low float zone, the distribution of the exhaust perforation area across the bed is nonuniform, the exhaust perforation area at and adjacent the longitudinal centerline of the bed being relatively large and then gradually diminishing toward the edges of the bed. More specifically, the size of the exhaust perforations is relatively large adjacent the center of the bed and diminishes toward the edges of the bed. Hence, the reduced size of the exhaust perforations adjacent the edges of the bed, compensates for support gases exiting between the glass sheet at the edge of the bed, thereby providing relatively uniform support for the glass sheet from one edge to the other thereof.

Other objects, features and advantages of the invention will appear more clearly from the following detailed description of a preferred embodiment thereof made with reference to the drawings in which:

FIGURE 1 is an isometric view, with parts broken away and partially schematic, of the preferred apparatus and illustrates the bed configuration into and through the heating furnace wherein the glass sheets are curved, and into and through blasthead wherein the curved sheets of glass are tempered;

FIGURE 2 is an enlarged isometric view of a portion of the support bed within the furnace to illustrate the transition zone just prior to the curved portion of the bed.

FIGURE 3 is a cross sectional view of a portion of the bed zone illustrated in FIGURE 2 taken substantially along the line 3–3 of FIGURE 2 and looking in the direction of the arrows;

FIGURE 4 is a cross-sectional view of a portion of the bed zone illustrated in FIGURE 2 taken substantially along the line 4–4 of FIGURE 2 and looking in the direction of the arrows;

FIGURE 5 is a fragmentary top view of a portion of the bed shown in FIGURE 1 from side to side thereof and illustrates the arrangement of exhaust perforations across the bed.

Referring now to FIGURE 1, the apparatus shown is as disclosed and covered in the aforesaid United States patent application and comprises an elongate perforated bed, illustrated generally by the numeral 20, which in the actual embodiment herein shown is about 180 feet long and is composed of three main sections. These sections include a loading section 21, a heating and bending section 22 is within and constitutes the floor of an elongate furnace structure, illustrated generally by the numeral 24, and the tempering section 23 extends through a cooling blasthead, illustrated generally by the numeral 25. The bed is flat throughout section 21 and most of section 22 and approximately two-thirds of the way through section 22 gradually becomes curved in a direction transverse to the longitudinal axis of the bed. Bed section 23 within the blasthead 25 and the portion of section 22 toward the end of the furnace adjacent the blasthead have a uniform transverse curvature the same as that desired of the glass sheets to be manufactured. The plane of the bed is tilted about the longitudinal axis thereof to an angle of about 12° to the horizontal, and hence the left longitudinal edge of the bed, as shown at 26, is lower than the right edge 27. A chain conveyor, illustrated generally by the numeral 28 and of a type more clearly set out in United States patent application Ser. No. 328,222 filed Dec. 5, 1963, in the name of Harold A. McMaster and assigned to the assignee of the present invention, carries spaced pairs of glass sheet support pads 29 and serves to move the glass sheets over the bed 20 from the loading section 21 through the furnace 24 and throughout the blasthead 25. Gas emitted from perforations in the bed 20 provides a film or cushion of gas on the bed for flotation of the glass sheets thereover in a manner to become hereinafter more apparent. In essence, then, and without attention at this time to important features and details to be hereinafter described, the apparatus operates as follows: The glass sheets 30 to be curved and tempered are placed onto the bed at loading section 21 with the bottom edge of each sheet resting on a pair of pads 29 secured to the conveyor chain 28. The glass sheets are conveyed by the chain and float over the bed out of contact therewith by reason of the gas emitted from the perforations in the bed. The floating glass sheets are thus guided through the furnace 24 where they are heated to deformation temperature by the hot gases emitted from the bed perforations and as they reach the curved portion of section 22, the sheets sag under gravity to conform to the curvature thereof, all the while supported on gas out of contact with the bed. Hence, when the sheets reach the end of the furnace they are shaped with the full curvature desired. Transportation of the floating heated curved glass sheets then continues through the blasthead 25 where they are tempered by the cooling air projected from the bed perforations in the blasthead.

The furnace in the embodiment shown is about 140 feet long and operates at a temperature upwards of 1100° F. and as high as 1350° F., different temperature zones being maintained within the furnace as fully described in the aforesaid application Ser. No. 326,713.

The entire bed section 22 is formed of ceramic having an extremely low coefficient of thermal expansion. More specifically, the bed section 22 in the furnace 24 is formed of fused quartz blocks 31, each of which has a width equal to the width of the bed and a length of about 30 inches. Hence, the entire 140 foot bed section 22 comprises fifty-six of the quartz blocks 31 axially aligned and in abutting relationship and preferably with a smooth powdered fused quartz caulking filling any crevices therebetween to seal and cement the blocks together. The blocks are manufactured by casting and then firing to sintering temperature, about 2000° F., granular fused quartz preferably of variated grain size. Such blocks have an extremely low coefficient of thermal expansion, about $0.54 \times 10^{-6}/°$ C., along with extremely high heat shock resistance and therefore last indefinitely with practically no maintenance.

In order to provide heat within the furnace 24, a plurality of burners, illustrated generally by the numeral 41, are provided. The burners 41 may be of any suitable type sufficient to provide the proper amount of heat and to operate on a convenient fuel, such as a gas and air mixture. The burners receive the fuel and air mixture through a conventional piping system, not shown. Radiant burners which burn at a temperature of about 2000° F. and which are well known in the glass processing furnace art are preferred.

The heating system for the glass sheets is a circulating hot gas system, and the circulation both supports the glass sheets and assists in heating the glass sheets as they pass along the support bed 20. To accomplish this, a longitudinal vertical wall 43 having spaced large circular openings adjacent the upper end thereof extends the length of the furnace and between this wall and the insulated back wall are a series of blowers, illustrated generally by the numeral 44, at spaced points along the length of the furnace, each blower being positioned at one of the large openings in the wall 43. These blowers circulate the hot gases from the top of the furnace to a plenum underneath the bed and then up through the perforated bed to thereby heat and float the glass sheets all as described in detail in the aforesaid patent application P–301.

Referring now to FIGURES 2 and 4, in the portion of the bed at the first part of the furnace 24, the bed sections 31 may be generally rectangular flat sections approximately 30 inches long and of the desired width. Each of these sections is provided with a plurality of perforations to permit gas flow upwardly therethrough. A typical bed section 301 in this portion of the furnace is shown in FIGURES 2 and 4 and illustrates the perforations 302 formed therethrough. It has been found that for optimum flotation of the glass sheets over this section of the bed, the perforations preferably be about one-eighth inch diameters and spaced one-half inch apart laterally of the bed and three-quarters of an inch apart longitudinally of the bed. The perforations in adjacent transverse rows are staggered longitudinally such that every fifth row repeats the pattern and the one-eighth inch strip of impact of gas from each perforation onto the glass sheets moving thereover slightly overlaps the stripe from longitudinally slightly offset neighboring perforations to afford uniform support and heating.

The hot combustion product gases circulated by the blowers pass up through the perforations 302 to the top surface of each section. With the glass sheet 30 disposed above the upper surface and with the gases flowing through the perforations 302, a blanket of such gases will flow over the bed surface on which blanket the glass sheets 30 will float and become heated. The gases are permitted to flow across the surface, that is, between the surface and the glass sheet 30, and out from underneath the glass sheets 30 at the edges thereof. The hot gases continue to circulate by means of the blowers through the portion of the furnace containing the burners and again to the underside of the bed section 301. The flow rate of the gases caused by the blower and the size of the apertures 302 are such as to provide a suitable volume of gas between the glass sheet 30 and the upper surface to float the glass sheet thereover. Such volume of gas is at a relatively low pressure; it has been found that pressures in the neighborhood of one inch to two inches of water column pressure in the plenum in this portion of the furnace is sufficient. The average pressure between the glass and the bed is equal to the weight of the glass per unit of surface which in the case of one-fourth inch thick glass is five-eighths inch water column pressure. It has been found that a flow rate of approximately 7000 cubic feet per minute per 25 square feet of bed is ample. With the proper amount of gas flow to generate the proper pressure, the glass sheets 30 will float across the surface of the bed portion 301 at a distance of somewhere between .04 inch and .25 inch in this section of the furnace. This relatively high float in this portion of the furnace where the glass is rigid is advantageous in that it reduces the possibility of glass contact with the bed. Also, when the cold glass sheets first enter into the furnace there is likely to be a certain amount of warpage thereby increasing the possibilities of glass contact with the bed which possibilities are, as stated above, reduced by using a higher float. Hence, extremely accurate control of the bed surface is not essential in this portion of the furnace. At the edges of the glass sheets the pressure is substantially zero and it will be obvious, therefore, that once the glass sheets reach deformation temperature this system of support would not be desirable and hence another configuration is used, such configuration to be described forthwith.

The hot gases emitted through the perforations 302 heat the glass sheets up to deformation temperature by the time the sheets reach a point just prior to the end of the flat bed portion. In the portion of the bed at the end of the furnace, i.e. the last part of the flat portion and all those portions where the contour of the support bed 20 is curved, the ceramic block sections take on a perforation pattern and configuration such as is best illustrated in FIGURES 2 and 3. In this portion of the furnace the bed sections 303 are provided with both inlet and exhaust perforations or apertures in a desired pattern. The inlet perforations 304 differ in these sections of the bed 20 in that the upper portions adjacent the top surface of the block 303 are enlarged, as at 307 in a manner similar to countersinking. The inlet perforations 304 are arranged in spaced transverse rows, and disposed between the rows are alternate rows of exhaust perforations 305. Exhaust perforations 305, as best illustrated in FIGURE 3, extend partially through the block section 303 and communicate with transverse passages 306 extending through the block section 303 from side to side. Such passages 306 open through the side of the block sections 303 and into the furnace 24 and thus permit the exhaust gases to be exhausted directly into the furnace for recirculation. The aggregate of the perimeters of the inlet perforations in the plane of the bed surface is greater than the aggregate of the perimeters of the outlet perforations in the same plane, such that when a sheet of glass is positioned in close spaced parallel relationship to the bed surface, the aggregate of the areas of imaginary walls extending from the outlet orifices to the plane of the glass is less than the aggregate areas of imaginary walls extending from the enlarged portions of the inlet perforations to the plane of the glass. The outlets function therefore, to provide restrictive orifices for the gas flow and create a positive pressure sufficient to support the glass. Hence, where the exhaust and inlet perforations are all round and where the number of exhaust openings is about equal to the inlet openings, as in the embodiment shown, the diameter of the exhaust perforations 305 is smaller than that of the enlargements of inlet perforations 307.

It is important to note therefore, that the diameter and therefore the perimeter of the exhaust perforations 305 is smaller than that of the enlarged upper end of the inlet perforation 307. With a glass sheet 30 spaced from the surface of the section 303, there is formed annular orifice 315 about the inlet perforation 307 which is larger than a similar annular orifice 316 formed between the glass sheet and the outlet or exhaust perforation 305. Since the inlet orifice 315 is larger than the exhaust orifice 316 by reason of the larger perimeter of the inlet orifice, there will be a positive pressure above the surface of the bed section 303 sufficent to maintain the glass sheet on the blanket of gas thus produced. In effect, then, there is substantially continuous gas blanket support for the glass sheets, the only voids in the gas blanket support being directly over the exhaust perforations. Summarizing, the system is functionally one wherein the gas support blanket is provided by the restrictive exhaust perforations which create a back pressure which increases rapidly as the glass sheet settles toward or approaches the bed and the area of the annular orifices 316 decreases until the glass sheet reaches an equilibrium level above the bed. The inlet perforations serve merely to supply low pressure gas to the constantly recirculating gas blanket. Measurements show that the pressure in the enlarged generally conically shaped upper extremities 307 of the inlet passages 304 is not substantially less than the pressure in the plenum chamber. The plenum chamber pressure in this portion of the furnace wherein both inlets and exhaust are used may be on the order of 1.8 to 2.5 inches water column pressure. The pressure of the gas support blanket between the bed and the glass sheet is about equal to the plenum pressure immediately over the inlet perforations and tapers off toward the exhaust orifices, the pressure directly over the exhaust orifices being zero; however, there is a positive pressure over substantially the entire surface of the bed, except directly over the exhaust perforations, sufficient to support the glass sheet at its equilibrium level as before described. By having both inlet and outlet perforations in this zone of the bed it is not necessary that the gases emitted from the bed travel across the bed and escape about the edges of the glass. The gases can circulate from the inlet perforations to nearby outlet perforations and this assures a relatively uniform average pressure throughout the central areas of the glass up to a relatively narrow, about one-half inch, margin area adjacent to the edges of the glass from which area the gases can escape about the edges of the glass. Compensation for this gas escape is made in a manner to be later described.

Because the gas feed from the inlets need only be and is at low pressure, there is little or no tendency of the hot gases being fed to cause localized distortions in the glass as is the case where high pressure jets impinge against the bottom glass surface.

Since heated gases are entering through the perforations 304, it would not be desirable to have a continual axial row of inlet perforations since this would produce an axial or longitudinnal stripe of hot gases against the under surface of the glass sheet 30. To avoid this problem, each inlet passage 304 in the longitudinal direction is offset slightly from the preceding inlet passage. A suitable spacing has been discovered to be a repeat of every fifth row of inlet passages and to equally displace the succeeding perforations therebetween. In this manner, the entire surface of the glass sheet 30 will be properly heated without localizing or aligning heated sections thereof. The outlet perforations are likewise staggered, in the direction generally longitudinally of the bed.

The flow rate and the spacing and pattern of the perforations in the block section 303 are such as to make the glass sheet 30 float at a closer distance to the support bed 20 than during the earlier portion. The inlet perforations 304 in block sections 303 have a diameter of one-eighth inch flaring outwardly to about three-eights inch at the top surface of the bed section. The depth of the flare is not critical but may be approximately one-quarter of an inch. The larger of the exhaust perforations 305 are slightly less than one-quarter inch in diameter. Both the inlet and exhaust perforations may be one and one-half inches apart longitudinally and one-half inch apart laterally. In accordance with the present invention and as will be further alluded to hereinafter, the outlet perforations decrease in size from the center of the block section laterally to the edges.

It has been found desirable to provide a flow rate of approximately 3500 cubic feet per minute per 25 square feet of bed area and a gas pressure of somewhat in the neighborhood of 1.8 to 2.5 inches of water pressure in the plenum section. Under such conditions, the glass sheets 30 will float lower or closer to the support bed than in the earlier portion, and at a distance of about .005 to .020 inch. Under such conditions the glass sheets more readily conform to the contour of the surface of the bed sections 303.

In accordance with the present invention, between the high float section and the low float section of the bed, as aforedescribed, in a float transition zone which brings the glass sheets 30 from the high float condition to the low float condition in smooth and gradual manner.

This float transition zone comprises, in the embodiment shown, a pair of block sections 310. Block sections 310 have a plurality of inlet perforations 311 which are substantially the same in form, number and pattern as the inlet perforations 304 in block section 303. These inlet perforations are arranged in lateral rows across the block sections 310 and are aligned in rows angularly disposed relative to the longitudinal axis of the bed 22. To accomplish a gradual float transition, the block sections 310 are provided with exhaust passages 312 which pass part way through the block section 310 and communicate with transverse passages 313 extending laterally through the block sections to route the exhausted gas back to the upper part of the furnace. The exhaust passages 312 increase along the length of the two block sections and in the direction of the glass flow. In other words, at the beginning of block section 310, which is adjacent section 301, there are only a few exhaust perforations, at the end of the section 310 there is a substantially full complement of the exhaust perforations (i.e. almost as many per transverse row as in the low float section) and in between the number of exhaust perforations per transverse row thereof substantially uniformly increases in number from the very few to the full row.

The manner in which the exhaust perforations increase is not critical so long as the increase is relatively gradual. For example, the number of exhaust per row can increase by about four every fourth or fifth row starting out with eight in the first few rows and ending up at the other end of the transition zone with 44 which is substantially a full complement of 48 as used in the low float zone. The spacing of the exhaust perforations in any given row is likewise not critical althought it is desirable to use about equal spacing.

Further in accordance with the invention, and to compensate for gas escape at the marginal edge of the glass sheets 30, as aforesaid, the size of the exhaust perforations 305 in the low float zone, i.e. bed sections 303, and exhaust perforations 312 in the end of the transition zone vary in diameter laterally of the bed, being relatively large toward the center and small toward the edges.

In the particular embodiment of the invention shown (see FIGURE 5), in each full complement of rows of exhaust perforations in the low float zone, the first five exhaust perforations 317 adjacent the side edges of the block section are approximately one-eighth inch in diameter, the next six or seven exhaust performations 318 toward the center of the block are about three-sixteenths inch diameter and the twenty or so perforations 319 across the center of the bed are about one-quarter inch diameter.

With the arrangement as above described the glass sheet will gradually rather than abruptly decrease its distance from the bed as it passes over the transition zone and once the glass reaches its deformation temperature, there will be adequate and uniform gas support for the sheet substantially from edge to edge thereof thereby greatly reducing the possibilities of glass contact with the bed and better assuring that the sheet will have the precise shape desired.

In addition or as an alternative to using smaller size exhaust openings adjacent the edges of the bed, to compensate for gas exhausted at the edge of the bed, the gas inlet passages can, if desired, be made somewhat larger at the edges of the bed than in the middle adjacent the centerline thereof. For example, in each transverse row of inlet passages in the low float zone, the three or four inlet passages adjacent each edge of the bed can be somewhat greater than one-eighth inch, the inlet passages in the center of the bed being of one-eighth inch diameter as described. Of course, the inlet openings formed by the conical shaped tops of the passages should all be left as described, i.e. with a diameter greater than that of the exhausts. By so increasing the size of the inlet passages adjoint the bed edges more gas is admitted to the flotation blanket near the edges of the bed thereby compensating for gas exhaust at the bed edges.

Whereas a curved bed is used in the embodiment shown, a flat bed can be used, if desired, for example to manufacture flat tempered glass sheets. Various other modifications can also be made and hence, it will be understood that while the invention has been described in its particulars by reference to various preferred embodiments thereof, various changes and modifications made all within the scope of the claims which follow.

We claim:

1. In an apparatus for treating a sheet of glass while supporting the sheet on gases and transferring heat between the sheet and the gases, an elongated bed and the means for guiding a sheet over said bed longitudinally thereof, said bed having a first longitudinally extending zone with fluid inlet perforations therein for floating said sheet relatively high over and out of contact with said bed in said zone, a second longitudinally extending zone with fluid inlet and fluid exhaust perforations therein for floating said sheet relatively low over and out of contact with said bed in said zone, and a float transition zone intermediate said first and second zones and having fluid inlet and fluid exhaust perforations therein, the ratio of the aggregate cross-sectional area of the fluid exhaust perforations over the aggregate cross-sectional area of the inlet perforations in that portion of said transition zone adjacent said first zone being less than the ratio of the aggregate cross-sectional area of the fluid exhaust perforations over the aggregate area of the fluid inlet perforations in that portion of said transition zone adjacent said second zone thereby to cause the sheet to drop gradually from a high float position over said first zone to a low float position over said second zone.

2. Apparatus as set forth in claim 1 wherein the aggregate cross-sectional area of the fluid exhaust perforations in that portion of said transition zone adjacent said first zone is less than the aggregate cross-sectional area of the fluid exhaust perforations in that portion of said transition zone adjacent said second zone.

3. Apparatus as set forth in claim 2 wherein the number of exhaust perforations in said transition zone gradually increases longitudinally thereof from the first zone to the second zone.

4. Apparatus as set forth in claim 1 wherein the ratio of the aggregate cross-sectional area of said inlet perforations over the aggregate cross-sectional area of said exhaust perforations adjacent the edges of the bed is greater than the ratio of the aggregate cross-sectional area of said inlet perforations over the aggregate cross-sectional area of said exhaust perforations adjacent the center of the bed thereby to compensate for fluid exhausting between the sheet and the bed at the edges thereof.

5. Apparatus as set forth in claim 4 wherein the aggregate cross-sectional area of the exhaust perforations adjacent the edges of the bed is less than the aggregate cross-sectional area of the exhaust perforations adjacent the longitudinal center line of the bed.

6. In an apparatus for treating a sheet of glass while supporting the sheet on gases and transferring heat between the sheet and the gases, a bed having fluid inlet and fluid exhaust perforations therein, means for positioning a sheet over said bed, and means for circulating fluid from said inlet perforations to said exhaust perforations between said bed and the sheet thereby to provide a blanket of fluid to support the sheet out of contact with said bed, the ratio of the aggregate cross-sectional area of said inlet perforations over the aggregate cross-sectional area of said exhaust perforations adjacent the edges of the bed being greater than the ratio of the aggregate cross-sectional area of said inlet perforations over the aggregate cross-sectional area of said exhaust perforations adjacent the center of the bed thereby to compensate for fluid exhausting between the sheet and the bed at the edges thereof.

7. Apparatus as set forth in claim 6 wherein said aggregate cross-sectional area of said exhaust perforations adjacent said edges of the bed is less than said aggregate cross-sectional area of said exhaust perforations adjacent the center of the bed.

8. In a method for treating a sheet of glass wherein said sheet is moved over a first portion of a bed while supported on gas flows to maintain said sheet in spaced relationship to said bed and is subsequently moved over a second portion of said bed while supported on gas flows and maintained in a different spaced relationship to said bed, the improvement comprising moving said sheet over a portion of said bed which is intermediate said first and second portions while supporting said sheet on gas flows, changing the gas flows as the sheet moves along the intermediate portion for gradually changing the spaced relationship between said sheet and said bed while maintaining the gas flows under all portions of said sheet sufficient to prevent any portion of said sheet from contacting said bed.

9. In a method as set forth in claim 8 including heating said sheet substantially to deformation temperature and maintaining the gas support over said first and second portions such that said sheet is supported in closer spaced relationship with said bed over said second portion than over said first portion.

10. In a method of supporting a sheet of material on a blanket of gas above a bed comprising the steps of supplying a substantially constant quantity of gas to all areas over said bed and below said sheet, and withdrawing said gas through said bed in greater quantities adjacent the middle of said sheet than adjacent the sides of said sheet to compensate for the escape of gas at the sides of said sheet.

References Cited
UNITED STATES PATENTS 3,223,501  12/1965  Fredley et al. _____ 65—25

FOREIGN PATENTS 622,744  3/1963  Belgium.

DONALL H. SYLVESTER, *Primary Examiner.*

A. D. KELLOGG, *Assistant Examiner.*